United States Patent

[11] 3,590,874

| [72] | Inventor | David Y. Rice<br>Cleveland, Ohio |
|---|---|---|
| [21] | Appl. No. | 878,752 |
| [22] | Filed | Nov. 21, 1969 |
| [45] | Patented | July 6, 1971 |
| [73] | Assignee | David Y. Rice Co.<br>Cleveland, Ohio |

[54] VALVE DESIGN
7 Claims, 6 Drawing Figs.

[52] U.S. Cl. ................................................. 137/625.48,
251/363
[51] Int. Cl. ..................................................... F16k 11/07
[50] Field of Search ............................................ 137/625.48,
625.69, 625.68; 251/367, 363

[56] References Cited
UNITED STATES PATENTS

| 2,524,142 | 10/1950 | Seeloff | 137/625.48 X |
| 2,645,450 | 7/1953 | Chessman | 137/625.48 X |
| 2,920,652 | 1/1960 | Rudelick et al. | 137/625.48 X |
| 2,997,065 | 8/1961 | Johnson | 137/625.69 |
| 3,049,239 | 8/1962 | Rudelick | 137/625.48 X |
| 3,349,879 | 10/1967 | Stuart et al. | 137/625.69 X |
| 3,354,912 | 11/1967 | Gordon et al. | 137/625.69 |

FOREIGN PATENTS

| 1,356,400 | 2/1964 | France | 251/DIG. 1 |
| 1,127,675 | 4/1962 | Germany | 137/625.48 |

*Primary Examiner*—M. Cary Nelson
*Assistant Examiner*—Michael O. Sturm
*Attorney*—Meyer, Tilberry and Body ABSTRACT: A valve comprising a body having a circular bore and a plurality of fluid passages which extend into the bore at positions spaced longitudinally thereof. An elongated valve spool member extends axially through the bore and in combination therewith defines an annular channel. Positioned within the annular channel and surrounding the spool member are a plurality of generally cylindrical members each of which terminates in end faces perpendicular to its axis. Each of the members includes a circumferential seal ring that extend about the outer surface of the member substantially at its midplane for sealing between the member and the wall of the bore. The members also have a seal ring positioned about their inner surface for sealing between the member and the spool. Additionally, flow passages are formed through the cylindrical members on opposite sides of the seal rings.

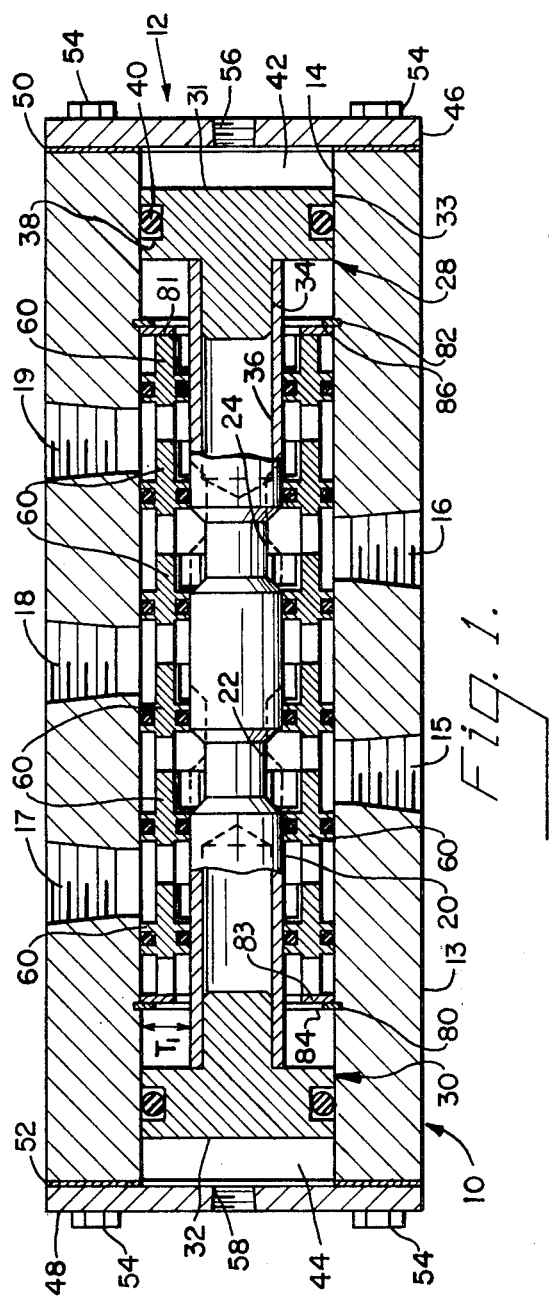
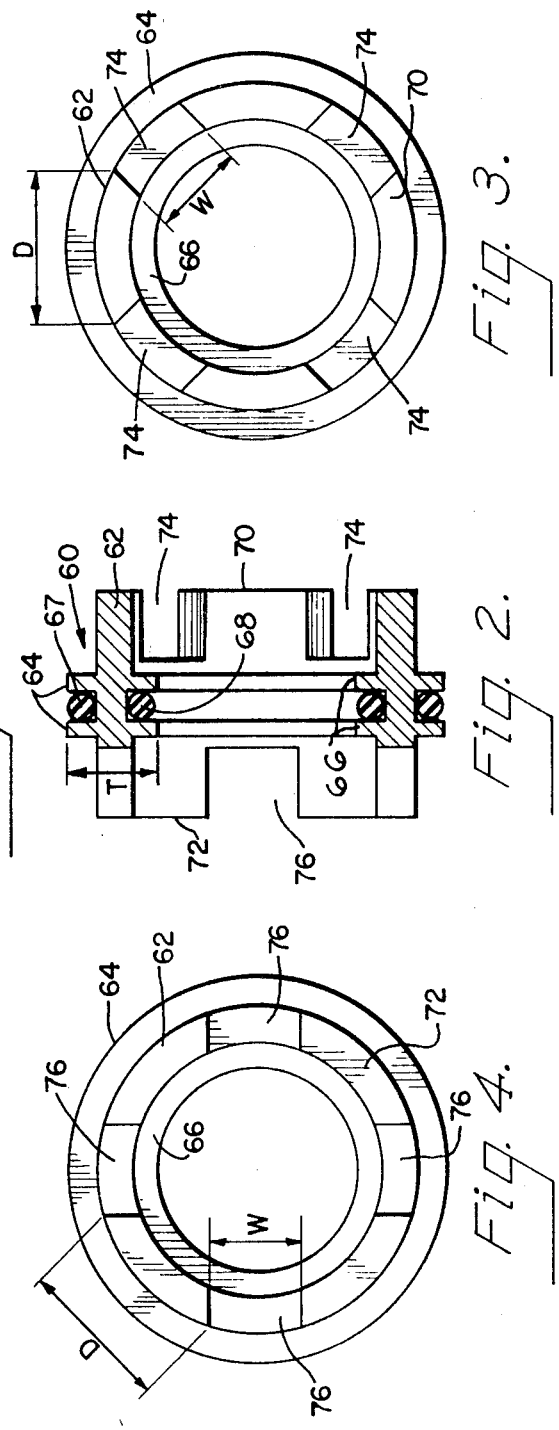
INVENTOR.
DAVID Y. RICE
BY Meyer, Tilberry & Body
ATTORNEYS.

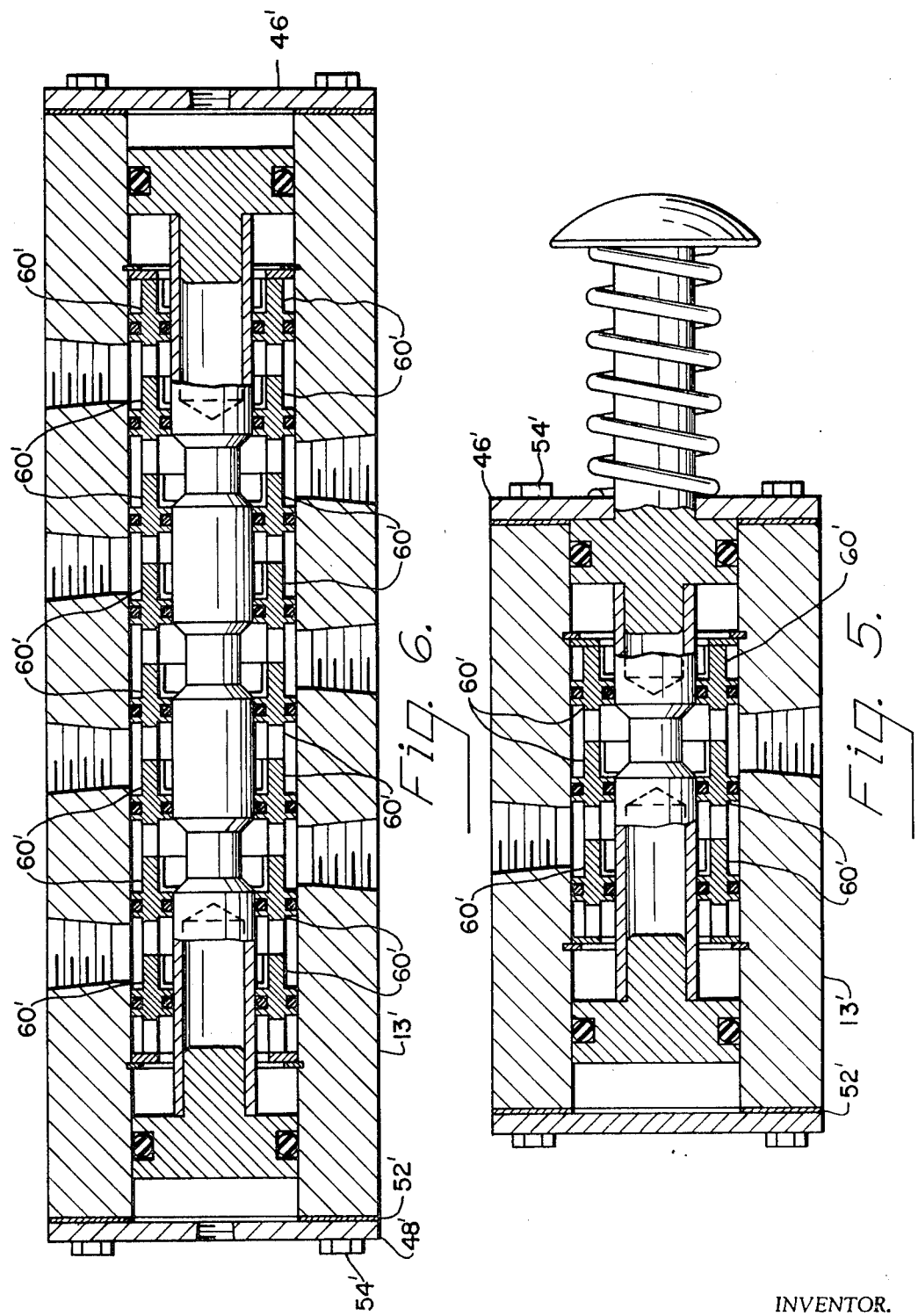

VALVE DESIGN

The present invention is directed to the valve art and, more particular, to an improved spool-type valve.

The invention is particularly suited for use as a multiport control valve for air or hydraulic systems and will be described with particular reference thereto; however, it will be appreciated that the invention can be manufactured for use in many diverse applications.

Air and hydraulic control systems normally require a large number of different valves from the simple two-way type to complex multiple-port arrangements. The many types required have increased the problems and expense involved for all persons concerned. From the manufacturer's standpoint the large number of types and their different components tends to limit the size of individual production runs and/or increase the inventory which he must carry. Likewise, the distributors and users must normally maintain a substantial inventory of valves and replacement parts.

Attempts have been made to simplify the design of the valves and arrange them so that certain parts are interchangeable between different valves. These attempts have not been particularly successful. First, the designs have required at least two different internal components which have to be assembled in particular patterns which vary depending upon the type of valve. Secondly, the differing internal components increase the likelihood of misassembly and malfunction, especially following field repairs.

The present invention overcomes the above problems and provides a valve assembly that needs only one type of internal member for a large number of different types of valves. The design is such that it cannot be misassembled since the internal members are preferably symmetrical about their midplanes.

In accordance with the invention there is provided a valve comprising a body having a circular bore and a plurality of fluid passages which extend into the bore at positions spaced longitudinally thereof. An elongated valve spool member extends axially through the bore and in combination therewith defines an annular channel. Positioned within the annular channel and surrounding the spool member are plurality of generally cylindrical members each of which terminates in end faces perpendicular to its axis. Each of the members includes a circumferential seal ring that extend about the outer surface of the member substantially at its midplane for sealing between the member and the wall of the bore. The members also have a seal ring positioned about their inner surface for sealing between the member and the spool. Additionally, flow passages are formed through the cylindrical members on opposite sides of the seal rings.

In accordance with a more limited aspect of the invention, all of the cylindrical members are identical and each is symmetrical about its longitudinal and lateral midplanes. Thus, only one type of the cylindrical members is required and the valves cannot be misassembled.

Accordingly, a primary object of the invention is the provision of a fluid control valve which is highly simplified and cannot be assembled incorrectly.

Another object is the provision of a valve of the type described which uses a minimum number of different parts.

A further object of the invention is the provision of a valve which is especially suited for controlling air and hydraulic systems.

Still another object is the provision of a valve structure that permits a large number of different valves to be made from the same basic parts.

Yet another object is the provision of a valve of the type described wherein all parts can be made symmetrical about their longitudinal and lateral midplanes so that it is impossible to misassemble the valve.

A still further object is the provision of a valve that is particularly suited for mass production manufacturing techniques.

Yet another object of the invention is the provision of a valve of the type described which is simple and reliable.

These and other objects and advantages will become apparent from the following description when read in conjunction with the accompanying drawings wherein:

FIG. 1 is a longitudinal cross-sectional view through a control valve formed in accordance with the preferred embodiment of the invention;

FIG. 2 is an enlarged cross-sectional view through one of the internal sleeve members of the FIG. 1 embodiment;

FIG. 3 is a right-end view of the sleeve member of FIG. 2;

FIG. 4 is a left-end view of the FIG. 2 member; and,

FIGS. 5 and 6 are longitudinal cross-sectional views through modified valves embodying the invention.

Referring more particular to FIG. 1 of the drawing, it will be noted that the embodiment shown comprises an elongated valve body portion 10 in which is mounted a fluid valving assembly 12.

As will be apparent hereafter, the valve body can have a variety of different configurations and, within the scope of the invention, be designed for controlling substantially any number of ports with different flow paths. In the embodiment shown, the body 10 is formed by an elongated cylindrical member 13 having a uniform diameter cylindrical center bore 14 extending axially therethrough. The center bore 14 is communicated with a plurality of inlet and/or ports 15—19. The ports are shown as extending radially through the wall of the member 12 at uniformly spaced positions; however, it is to be understood that the ports do not have to be radial or uniformly spaced. Each of the ports 15 through 19 is shown as being threaded to permit connection of necessarily fluid lines to the valve body for communication with the interior of the bore 14.

Axially positioned with the bore 14 and extending longitudinally thereof is a valve member 20. In the subject embodiment, the valve member 20 is a conventional spool-type member provided with a pair of reduced diameter flow passage forming areas 22 and 24. As shown, the areas 22,24 are spaced so as to substantially correspond to the spacing between the fluid ports 15 and 16 respectively. As previously mentioned, the member is mounted for sliding reciprocatory movement longitudinally within the bore 14.

Any desired type of actuating mechanism could be provided for moving the spool member 20. In the embodiment shown in FIG. 1, the means provided for moving the element comprise fluid piston means 28 and 30 carried in opposite ends of the bore 14 and drivingly connected to the member 20. The assemblies 28,30 each include a piston member 31 and 32 respectively. The members 31 and 32 are, in the preferred embodiment, identical in construction. Accordingly, only one will be described and the description is to be taken as equally applicable to the other unless otherwise noted. The member 31 comprises a circular metal disc 33 provided with a reduced diameter portion 34 which is arranged to be received in a bore 36 extending axially into the end of the spool 20. The piston 31 is releasably connected to the spool in any convenient manner such as through the use of a light pressure fit between the portion 34 and the bore 36. Formed circumferentially of the portion 33 is a groove 38 which receives a seal ring 40. This arrangement seals the inner portion of the bore from the outer portions and provides two sealed piston or pressure chambers 42 and 44 at opposite ends of the valve body.

Connected across the outer ends of the housing and enclosing the chambers 42,44 are end plates 46 and 48 respectively. The end plates are preferably sealed where they join the housing member 12 by suitable gaskets 50,52. The plates are removably connected to the body in any convenient manner such as through the use of machine screws 54.

As can be seen, by properly controlling the supply of pressurized fluid to the chambers 42,44 the spool member 20 can be caused to shift within the bore to connect in fluid flow relationship different ones of the inlet and outlet ports 15—19 in a manner subsequently to be described. Each of the plates 46,48 are provided with means for connecting a source of air or hydraulic fluid to the chambers. In the embodiment under consideration, these means are simple tapped openings 56,58 respectively.

The apparatus thus far described is relatively conventional and well known in the art. In accordance with the subject invention however, the valve assembly 30 includes an improved arrangement of the sleevelike internal members 60 which are positioned in the annular space between the member 20 and the inner wall of the bore 14. The members 60 are arranged to provide flow passages through the bore and between the ports 15—19. The members function to seal between the valve member 20 and the wall of the bore and operate in conjunction with the valve member 20 to provide the desired valving action. According to one aspect of the invention, the sleeve members 60 are symmetrical about a plane passing through their axial centerline, as well as about a plane perpendicular to this centerline and passing through the longitudinal midpoint of the members. This particular arrangement assures that when the valve is assembled it is impossible to misassemble the internal members. Additionally, as will become apparent hereafter, this arrangement permits the same members to be used for any of a large range of valve types.

Referring in particular to the FIG. 2, it will be seen that each of the members 60 comprises a cylindrical body portion 62 provided with a pair of outwardly extending circumferential flanges 64 and a second pair of inwardly extending flanges 66. The flanges are centrally located longitudinally of the portions 62 and function to hold O-ring seal members 67 and 68. As shown in FIG. 1, the overall radial distance T between the tops of the flanges 66,64 is slightly less than the annular distance $T_1$ between the wall of the bore between the outer surface of the valve member 20. The O-rings are sized so that the outer O-rings closely and sealingly engage the wall of the bore, while the inner O-rings slidingly and sealingly engage the outer surface of the member 20. Each of the members 60 terminate in end walls 70 and 72 which are perpendicular to the axes of the member. This permits the members 60 to be in engagement through the length of the valve body and eliminates any requirement as to their orientation about the longitudinal axis of the bore 14. Additionally, flow passages are formed through the members 60 on opposite sides of the O-rings. These flow passages could take many forms; however, in the embodiment under consideration, they comprise slots 74 and 76 which extend inwardly from the end faces 70,72 respectively. Obviously however, the flow passages could be a multiplicity of openings bored axially through the body portion. In the embodiment under consideration, the slots 74,76 are of a width W which is less than the distance D of the remaining intermediate portions. This prevents the members from "nesting" and requires them to maintain their proper spacing and relationship when they are placed in the valve.

Referring again to FIG. 1, it will be noted that the internal bore 14 of the valve is provided with small spaced grooves 80,82 in which are received snap rings 84 and 86 respectively. In the assembly of the valve one of the snap rings 82,84 is inserted, for example ring 84. A washer 83 is then positioned as shown, and the members 60 simply slid into position longitudinally of the valve until they are stacked completely the length thereof. Thereafter the washer 81 is moved into position and the other snap ring 82 is engaged in the groove to hold them in place. Obviously, other types of shoulder or stop forming members could equally well be used.

As can be appreciated, when the member 20 is in the position shown, the ports are blocked and flow cannot take place through the valve body. However, assuming that the valve member has been actuated to the right, it will be in the dotted line position thus connecting port 15 with port 18 and port 16 with port 19. Moving the valve member 20 to the left-hand end will, of course, connect port 15 with port 17 and port 16 with port 18.

By making the internal members in the manner described, the valve cannot be misassembled and the internal structures are simplified thus reducing manufacturing problems. An additional factor which should be noted is that there is a fixed abutment at each end of the stack of internal members and metal-to-metal contact between the internal members. Since the O-rings are carried on the internal members and are not between two rigid and relatively movable surfaces, it is not possible for the O-rings to be pinched and extruded as often happens in certain prior art valves.

FIGS. 5 and 6 clearly illustrate two additional valves which can be made by using the same internal members. Note that the valve shown in FIG. 5 is a double ported valve which can be used for simple on-off operations. The FIG. 6 embodiment is a valve having seven ports. Note that the number of internal members required for any of the valves is one greater than the number of ports.

As can be appreciated, by merely varying the length of the valve body and the valve member, substantially any desired type of valve can be made. The sleeve members are merely stacked up to provide the desired relationship.

This invention has been described in great detail sufficient to enable one of ordinary skill in the valve art to make and use the same. Obviously, modifications and alterations of the preferred embodiment will occur to others upon a reading and understanding of the specification and it is my intention to include all such modifications and alterations as part of my invention insofar as they come within the scope of the appended claims.

Having thus described my invention, I claim:
1. A valve comprising:
    a body having an elongated generally cylindrical bore extending therethrough and a plurality of first fluid passages extending into said bore at positions spaced longitudinally thereof;
    an elongated spool valve member adapted to extend axially through said bore and to define an annular channel in combination therewith, said valve member having at least one second fluid passage formed longitudinally therealong;
    a plurality of annular members received in end-to-end relationship in said annular channel, said plurality of members each including first means disposed about the outer diameter thereof for circumferentially sealing said members relative to said bore and second means disposed about the inner diameter thereof for circumferentially sealing said members relative to said valve member, said members each further including third fluid passages therein;
    means for retaining said plurality of members in predetermined desired relationship in said bore;
    means for reciprocating said valve member within said bore; and,
    each of said plurality of annular members being identical and receivable in random end-to-end relationship in said annular channel, whereby each of said plurality of annular members may be inserted into said channel without regard to its proper location or attitude relative to the other members in said plurality.
2. The valve as defined in claim 1 wherein each said annular member includes a central portion of slightly smaller diameter than said bore and first and second fluid passage portions extending longitudinally therefrom having said third fluid passages therein, said first and second portions extending equidistant from said central portion and having end faces generally perpendicular to the longitudinal axis of said member.
3. The valve as defined in claim 2 wherein said first and second sealing means comprise O-ring seals received on each said member at said central portion.
4. The device as defined in claim 1 wherein said retaining means comprises first and second snap rings received in first and second retaining grooves extending circumferentially around said bore in longitudinal spaced apart relationship sufficient for said plurality of members to be spaced therebetween.

5. In a valve of the type described including a body having an elongated bore extending therethrough and a plurality of first fluid passages extending into said bore, a hollow sleeve adapted to be received in said bore and having at least one second fluid passage thereon, and a spool valve member adapted to be received in said sleeve and longitudinally reciprocated therein so as to effect desired fluid flow through said first passages, the improvement comprising:

said sleeve being comprised of a plurality of identical sleeve members receivable in interchangeable random end-to-end relationship relative to said bore, each said sleeve member comprising a central portion having an outside diameter slightly less than the diameter of said bore and an inside diameter slightly greater than the diameter of said spool valve member, first and second means adjacent said central portion for respectively sealing said member relative to said bore and for sealing said member relative said spool valve member, said sleeve members each further having first and second passage portions of lesser outside diameter than said central portion and of sufficient inside diameter to receive said spool valve member and third fluid passages therein, said passage portions extending generally longitudinally equidistant from said central portion and including end faces generally perpendicular to the longitudinal axis of said member.

6. The improvement as defined in claim 5 wherein said third fluid passages comprise a plurality of slots arcuately spaced around said first and second fluid passage portions extending inwardly from said end faces toward said central portion, the arcuate dimension of said slots being at least slightly less than the arcuate dimension between said slots.

7. The improvement as defined in claim 6 wherein said first and second fluid passage portions each include four said slots arcuately spaced therearound and said first and second sealing means comprise O-ring seals received about the inner and outer circumference of said central portion.